United States Patent [19]

Huber et al.

[11] Patent Number: 4,465,336
[45] Date of Patent: Aug. 14, 1984

[54] WAVEGUIDE AND METHOD OF MANUFACTURING SAME

[75] Inventors: Hans P. Huber, Neu-Ulm; Peter Russer, Ulm, both of Fed. Rep. of Germany

[73] Assignee: Licentia Patent-Verwaltungs-GmbH, Fed. Rep. of Germany

[21] Appl. No.: 330,264

[22] Filed: Dec. 11, 1981

[30] Foreign Application Priority Data

Dec. 16, 1980 [DE] Fed. Rep. of Germany ....... 3047290

[51] Int. Cl.³ .............................................. G02B 5/14
[52] U.S. Cl. .............................. 350/96.30; 350/96.29; 350/96.34; 65/3.11; 65/3.12
[58] Field of Search ............... 350/96.29, 96.30, 96.33, 350/96.34; 65/3.11, 3.12

[56] References Cited

U.S. PATENT DOCUMENTS 4,123,483 10/1978 Nakahava .......................... 350/96.31
4,354,736 10/1982 Maklad et al. .................... 350/96.32

Primary Examiner—David K. Moore
Assistant Examiner—Akm E. Ullah
Attorney, Agent, or Firm—McGlew and Tuttle

[57] ABSTRACT

A waveguide and method of making the same is disclosed which comprises an elongated dielectric core surrounded by dielectric shell at least one of which have an anisotropic index of refraction. The core is made up of a plurality of layers each having a parallel surface normal with pairs of such layers having unequal indices of refraction. The layers are selected to preferably have the same thickness.

19 Claims, 5 Drawing Figures

WAVEGUIDE AND METHOD OF MANUFACTURING SAME

FIELD AND BACKGROUND OF THE INVENTION

The present invention relates in general to waveguides and in particular to a new and useful dielectric waveguide and method of making the same which has strong birefringent properties.

Two mutually orthogonally polarized waves can propagate in rotationally symmetrical dielectric waveguides. With a perfectly circular cross section of the waveguide, the two waves have exactly the same wave number. Consequently, no differences in propagation time occur between the two waves. In manufacturing such waveguides, however, as a rule, deviations from a perfect circular cross section must be taken into account, which are due to manufacturing tolerances, for example. The result is that the two mutually orthogonally polarized waves have unequal velocities of propagation. Because of the very small difference in the propagation velocities cross coupling occurs between the two waves. This leads to disturbances in the transmission of communications, for example.

SUMMARY OF THE INVENTION

The present invention is directed to a dielectric waveguide in which cross couplings between orthogonally polarized waves are minimized, and to a method of manufacturing such a waveguide.

Accordingly, an object of the invention is to provide a waveguide which comprises an elongated dielectric core and a dielectric cladding surrounding the core with at least one of the core and cladding, in a direction perpendicular to a major axis of the waveguide, has at least one anisotropic index of refraction.

A further object of the invention is to provide a method of manufacturing such a waveguide which comprises placing a slender bar in a tube, with the bar and/or the tube being built up of a plurality of layers which, in one direction, are substantially parallel to one of a bar or tube axis, and drawing such an arrangement into an optical waveguide so that the bar forms a core surrounded by the tube.

Another object of the invention is to provide a waveguide which is simple in design, rugged in construction and economical to manufacture.

On advantage of the invention is that the waveguide sustains the polarization of the waves excited therein.

The various features of novelty which characterize the invention are pointed out with particularity in the claims annexed to and forming a part of this disclosure. For a better understanding of the invention, its operating advantages and specific objects attained by its use, reference is made to the accompanying drawings and descriptive matter in which preferred embodiments of the invention are illustrated.

BRIEF DESCRIPTION OF THE DRAWINGS

In the following, some embodiments of the invention are explained in more detail with reference to the drawings in which.

DESCRIPTION OF THE PREFERRED EMBODIMENTS

Figure 1:
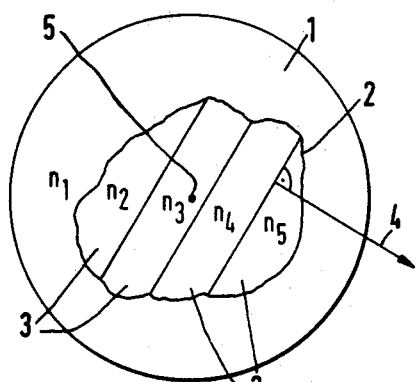
FIGS. 1 and 2 are diagrammatical showings to explain the invention.

Referring to the drawings, FIG. 1 is a sectional view of a dielectric waveguide comprising a cladding of a dielectric material and a core 2 enclosed therein. Core 2 is composed of a sequence of several layers 3 having mutually different refractive indices, for example $n_2$ to $n_5$. Layers 3 are superposed substantially in parallel, so that the surface normal 4 to layer 3 is substantially at right angles to the longitudinal axis 5 of the waveguide. Such a core 2 is electrically and optically anistropic and has a refractive index which is a function of the direction of polarization of an electric or optical wave which has been excited in the waveguide. Cladding 1 is electrically or optically (that is, electromagnetically) isotropic and has an index of refraction $n_1$.

Figure 2:
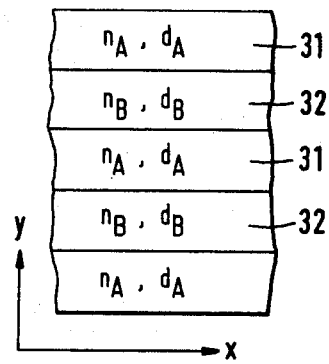

FIG. 2 shows a partial sectional view of another inventive core 2. The succession of layers is built up of sequences of two layers 31,32 in such arrangement that always one layer 31 having a refractive index $n_A$ and a thickness $d_A$ is followed by a layer 32 having a refractive index $n_B$ and a thickness $d_B$.

If the thicknesses $d_A$ and $d_B$ are sufficiently small, so that the electric field of the guided wave varies in a direction y only slightly over a length corresponding to thicknesses $d_A$ or $d_B$, such a multilayer structure can be represented, in the same way as a homogeneous electrically or optionally anistropic material, by a refractive index which is a function of the direction of polarization. This is the case, for example, if the waveguide only guides the dominant mode of a wave or is excited only in the dominant mode or, with an excitation of more complex modes, the ordinal indices of the modes are small as compared to the number of layers 3. The mentioned condition mainly facilitates the explanation of the invention, however, does not set bound on the application of the invention in principle.

Under the mentioned conditions, the refractive index $n_x$ for an electromagnetic wave polarized in the direction x is given by the formula $$n_x = \sqrt{\frac{n_A^2 d_A + n_B^2 d_B}{d_A + d_B}}$$

The refractive index $n_y$ for a wave polarized in the direction y is given by the formula $$n_y = n_A \cdot n_B \sqrt{\frac{d_A + d_B}{n_A^2 d_B + n_B^2 d_A}} .$$

If the refractive indices $n_A$ and $n_B$ are not equal to each other, the refractive index $n_x$ always exceeds the refractive index $n_y$. The ratio of $n_x/n_y$ has its maximum value for the thickness $d_A = d_B$. Therefore, manufacturing considerations permitting, it is advantageous to provide equal thicknesses $d_A$ and $d_B$. For $d_A = d_B$, the relation is $$\frac{n_x}{n_y} = \frac{1}{2}\left(\frac{n_A}{n_B} + \frac{n_B}{n_A}\right).$$

In the following table, the relative differential refractive indices $(n_x - n_y)/n_y$ are given as a function of the relative differential refractive index $(n_A - n_B)/n_A$:

| $(n_A - n_B)/n_B$ | $(n_x - n_y)/n_y$ |
|---|---|
| $10^{-4}$ | $5 \times 10^{-9}$ |
| $10^{-3}$ | $5 \times 10^{-7}$ |
| $10^{-2}$ | $4.95 \times 10^{-5}$ |
| $10^{-1}$ | $4.54 \times 10^{-3}$ |

Figure 3:
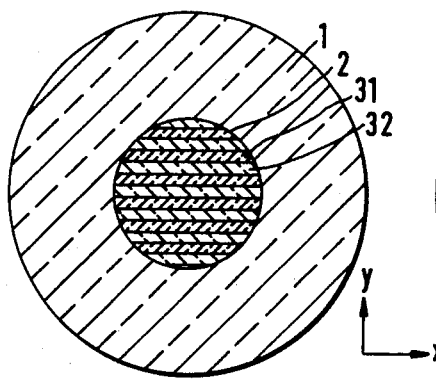
FIGS. 3 to 5 are cross-sectional views taken perpendicularly to the longitudinal axis of inventive waveguides.

FIG. 3 shows an inventive waveguide having a substantially circular cross-section. The cladding is substantially elecrically or optically isotropic. The electrically or optically anisotropic core 2 comprises layers 31, 32 having unequal refractive indices $n_A$, $n_B$ (according to the table above) and equal thicknesses $d_A$, $d_B$. A wave polarized in the direction x or direction y has a phase coefficient $\beta_x$ or $\beta_y$, it being understood that the a phase coefficient is the ratio of (phase rotation of the wave) to (unit length of the waveguide). The ratio of $(\beta_x - \beta_y)/\beta_y$ is given, for a definite mode of the excited wave, by the relation $$\frac{\beta_x - \beta_y}{\beta_y} = k \frac{n_x - n_y}{n_y}$$

with the constant k ranging between 0 and 1 and being larger, the stronger the wave is guided by core 2.

The invention is particularly advantageous if the waveguide is designed to propagate only the dominant mode of the wave of the type $HE_{11}$. This mode is described, for example, in the publication "Scientific Reports AEG Telefunken" Vol. 44 (1971), pp 64–70, by O. Krumpholz. An application of the invention to an optical waveguide, i.e. an optical fiber, is also of particular interest. In such a case, the $HE_{11}$ mode polarized in the direction x has a phase coefficient which is by $k(n_x/n)$ higher than the mode polarized in the y direction. With $(n_A - n_B)/n_A = 10^{-2}$, and $k = \frac{1}{2}$, the ratio $(\beta_x - \beta_y)/\beta_y = 2.5 \times 10^{-5}$. For a wavelength of 0.95 microns of the excited wave, and a refractive index of $n_A = 1.5$, this corresponds to an optical wavelength difference of one wavelength over a waveguide length of 23 mm.

It is known that unequal phase coefficients $\beta_x$ and $\beta_y$ may be produced, for example, by providing a waveguide core 2 which is not rotationally symmetrical. If core 2 has an elliptic cross-section, for example, the $oHE_{11}$ wave polarized in the direction of the major axis of the ellipse has a higher phase coefficient than the $eHE_{11}$ wave which is polarized in the direction of the minor axis of the ellipse. Dielectric waveguides with an elliptic cross-section are known in the art (see for example: "Elliptical Dielectric Waveguides", by D. Yeh, G. Appl. Journal of Phys. 33 No. 11, pages 3225–3243 (1962); "Preservation of Polarization in Optical-Fibre Waveguides with Elliptical Cores", by R. B. Dyott, J. R. Cozens, D. G. Merris, Electron. Letters 15 No. 13, pages 380–382).

Figure 4:
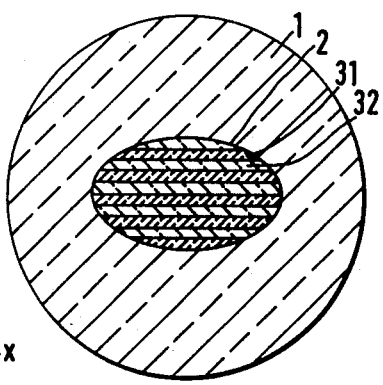

FIG. 4 shows an advantageous development of the invention, in which a substantially elliptical cross-section of core 2 is combined with the multilayer structure according to FIG. 3. Both the elliptical shape and the multilayer structure of the core produce an inequality of $\beta_x$ and $\beta_y$. Either of these features produces an effect of the same order of magnitude. By a combination of the features, the effects add, provided the layers 31, 32 of the multilayer structure extend substantially parallel to the major axis of the ellipse.

Numerous other cross-sectional shapes of the core are possible, for example, a rectangular cross-section. In all instances, it is necessary to provide the largest dimension of the cross-section of the core in a direction which is substantially parallel to the layer planes of the multilayer structure.

Figure 5:
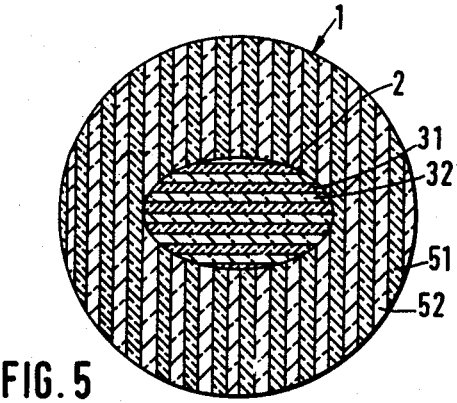

FIG. 5 shows diagrammatically another embodiment of the invention. The cladding 1 and core 2 of the waveguide are electrically or optically anisotropic. This is obtained, for example, by providing both cladding 1 and core 2 as a structure of sequential layers where the individual layers have unequal refractive indices. In addition, it is possible, as in FIG. 4, to make core 2 with a cross-section differing from a circular one. In the example of FIG. 5, core 2 is substantially elliptical and built up of layers 31, 32. The electrically or optically anisotropic cladding 1 also is composed of layers 51, 52 having mutually different refractive indices. With such an arrangement, it is advantageous if the layers 31, 32 of the core extend substantially perpendicularly to layers 51, 52 of cladding 1. Other designs are possible, with any cross section of core 2.

In still other designs (not shown) the cladding is electrically or optically anisotropic while the core is made of an electrically or optically isotropic material. Any cross-sectional shape of the core may be provided.

A method of manufacturing such waveguides, particularly for optical waves, substantially makes use of the so-called bar-tube process. This includes, quite generally, placing a slender (glass) bar concentrically in a (glass) tube and drawing both, under application of heat, to an optical waveguide, i.e., an optical fiber. By providing a bar and/or tube having a stratified structure and proceeding in the same way, waveguides in accordance with the invention may be manufactured. The stratified structure substantially comprises superposed layers, with the shape corresponding to that of the waveguide to be produced.

The following are some examples of how the bar or rod may be manufactured:

(a) On a strip of carrier material, such as glass, vitreous or vitrifying layers are deposited, in a pyrolytic process, for example.

(b) On the inner surface of a carrier tube, such as of glass, several vitreous or vitrifying layers are deposited, in a pyrolytic process, for example. Then, the carrier tube is cut, substantially parallel to its longitudinal axis, for example by sawing and/or etching, to produce one or more bars having a stratified cross-sectional structure.

(c) A carrier tube provided on its inside surface with one or more layers is collapsed, for example under heat application, perpendicularly to its longitudinal axis, to obtain a strip, a rod, or bar having the desired stratified cross-sectional structure.

The tube may be manufactured, for example by building up a stratified body of substantially parallel layers (of glass) and drilling a hole into the body, with the axis of the hole extending substantially parallel to the layer plane and the diameter of the hole exceeding the largest diameter of the used rod.

While specific embodiments of the invention have been shown and described in detail to illustrate the application of the principles of the invention, it will be understood that the invention may be embodied otherwise without departing from such principles.

What is claimed is:

1. A waveguide comprising an elongated dielectric core and dielectric cladding surrounding the core, at least one of the core and cladding, in the direction perpendicular to a major axis of the waveguide having at least one anisotropic index of refraction, at least one of the core and cladding being built up of a succession of at least one of electromagnetically isotropic and electromagnetically anisotropic layers which have unequal refractive indices in identical directions, and the major axis of the waveguide being substantially perpendicular to a surface normal to the layers.

2. A waveguide according to claim 1, wherein the succession of layers comprises a continuous sequence of two layers having alternately different refractive indices and being substantially electromagnetically isotropic.

3. A waveguide according to claim 2, wherein the succession of layers comprising two layers have substantially identical thicknesses ($d_A$).

4. A waveguide according to claim 3, wherein an electromagnetically anisotropic core is formed by a succession of layers, and is surrounded by a substantially electromagnetically isotropic cladding.

5. A waveguide according to claim 3, wherein an electromagnetically anisotropic cladding is formed by a succession of layers and encloses an electromagnetically isotropic core.

6. A waveguide according to claim 4 or 5 wherein, in a direction perpendicularly to the major axis of the waveguide, the core has a cross-section which is substantially circular.

7. A waveguide according to claim 6 wherein a first succession of layers forms an electromagnetically anisotropic core and a second succession of layers forms an electromagnetically anisotropic cladding.

8. A waveguide according to claim 7, wherein the surface normal to the first succession of layers is substantially perpendicular to the surface normal to the second succession of layers.

9. A waveguide according to claim 7, wherein the core is circular in cross-section and the cladding is cylindrical in cross-section.

10. A waveguide according to claim 1, wherein the core built up of a first succession of layers and has a cross-section having a larger extent in the direction of the layer planes.

11. A waveguide according to claim 1, wherein the shell is built up of a second succession of layers, the core having a cross section having a larger extent in a direction substantially parallel to the surface normal to the second succession of layers, than in a direction perpendicular thereto.

12. A waveguide according to claims 10 or 11, wherein the core has a substantially elliptical cross section.

13. A waveguide according to claims 10 or 11 wherein the core has a substantially rectangular cross section.

14. A waveguide according to claim 1, wherein the waveguide is an optical waveguide.

15. A method of manufacturing a waveguide according to claim 13, comprising: placing a slender bar in a tube, with the bar and/or the tube being built up of a plurality of layers which, in one direction, are substantially parallel to one of a bar axis and tube axis, and drawing such an arrangement into an optical waveguide in such a way that the bar forms a core and the tube forms a cladding of the optical waveguide.

16. A method according to claim 15, wherein the bar and/or the tube are substantially made for one of a vitreous and vitrifying material.

17. A method according to claim 15, wherein the bar is manufactured from a stip of a carrier material on which several layers are deposited.

18. A method according to claim 15, wherein the bar is manufactured from a carrier tube which is coated on its inside with at least one layer and which, upon depositing the coating, is collapsed to a cylindrical body of symmetrical shape in such a way that the cross-section of the bar become substantially one of circular, elliptical and rectangular in shape.

19. A method according to claim 15, wherein the tube is manufactured from a body built up of substantially parallel layers, in a way such that the layers come to extend substantially parallel to the axis of the tube.

* * * * *